Sept. 18, 1951 W. R. MOORE 2,568,509
MANIFOLDING DEVICE
Filed Feb. 26, 1948 4 Sheets-Sheet 1
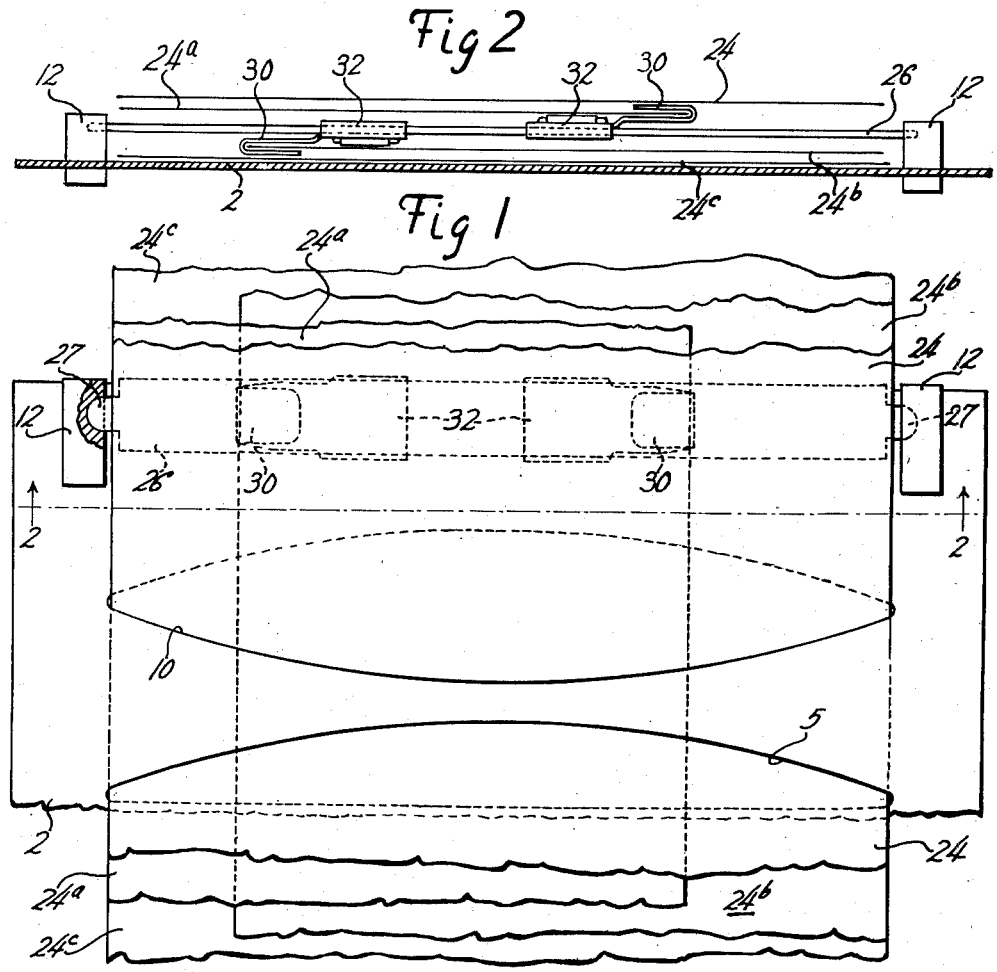
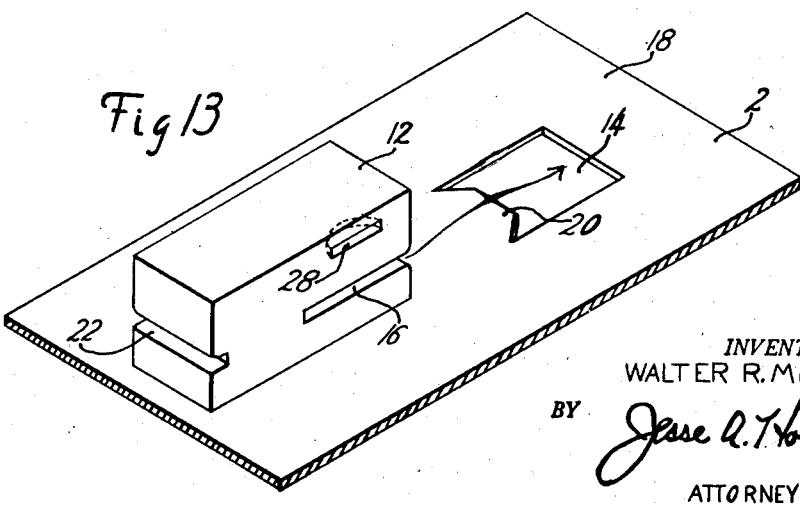
INVENTOR.
WALTER R. MOORE
BY Jesse A. T. Holton
ATTORNEY Sept. 18, 1951 W. R. MOORE 2,568,509
MANIFOLDING DEVICE
Filed Feb. 26, 1948 4 Sheets-Sheet 2
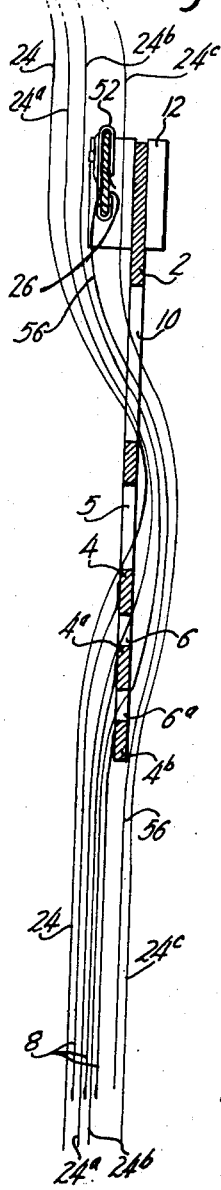
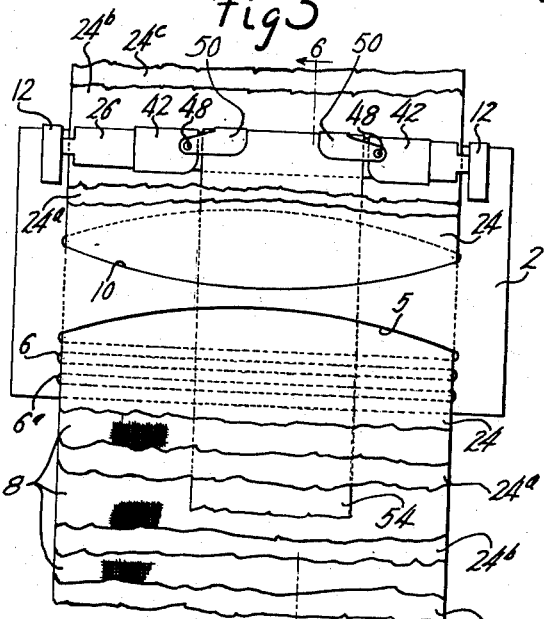
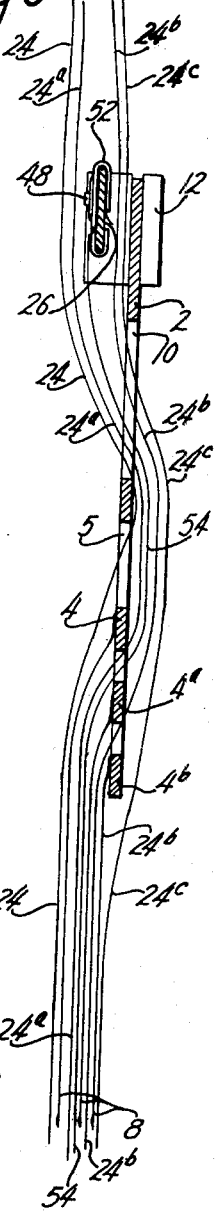
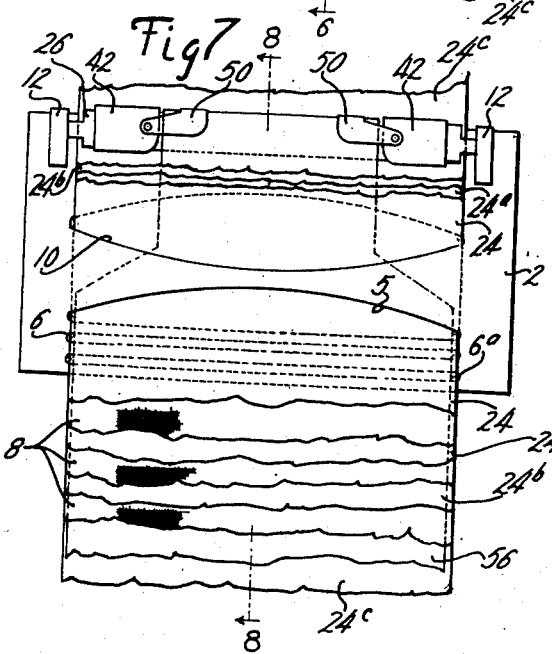
INVENTOR.
WALTER R MOORE
BY
*Jesse A. Holton*
ATTORNEY

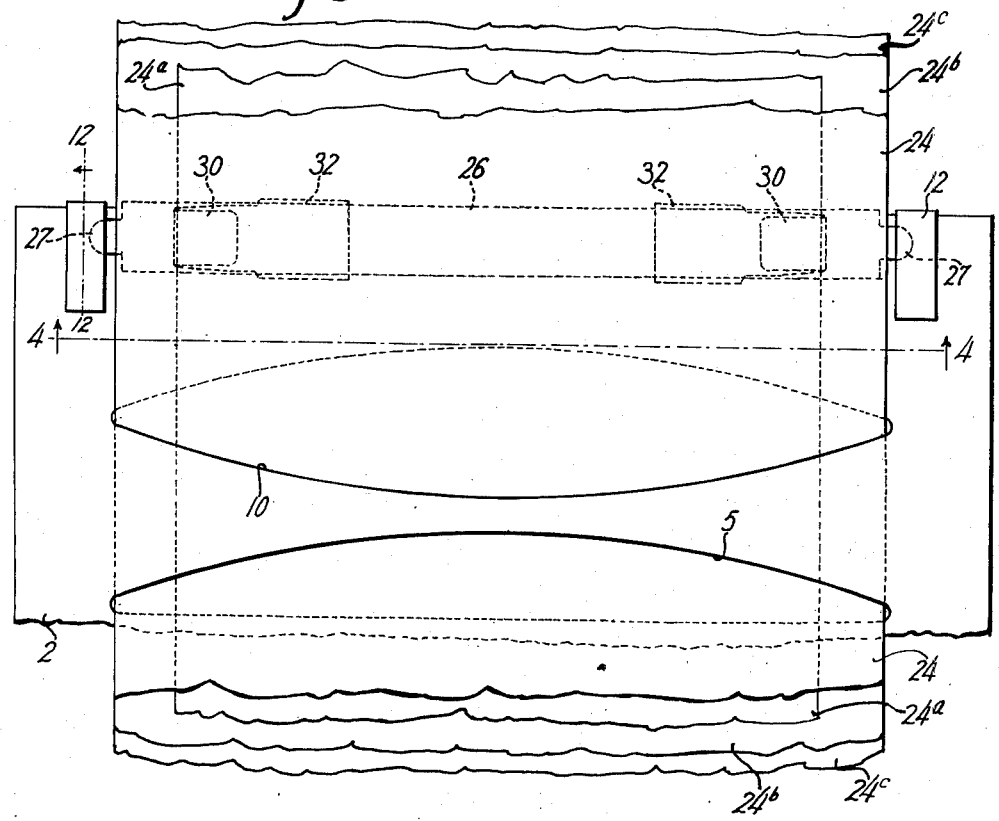

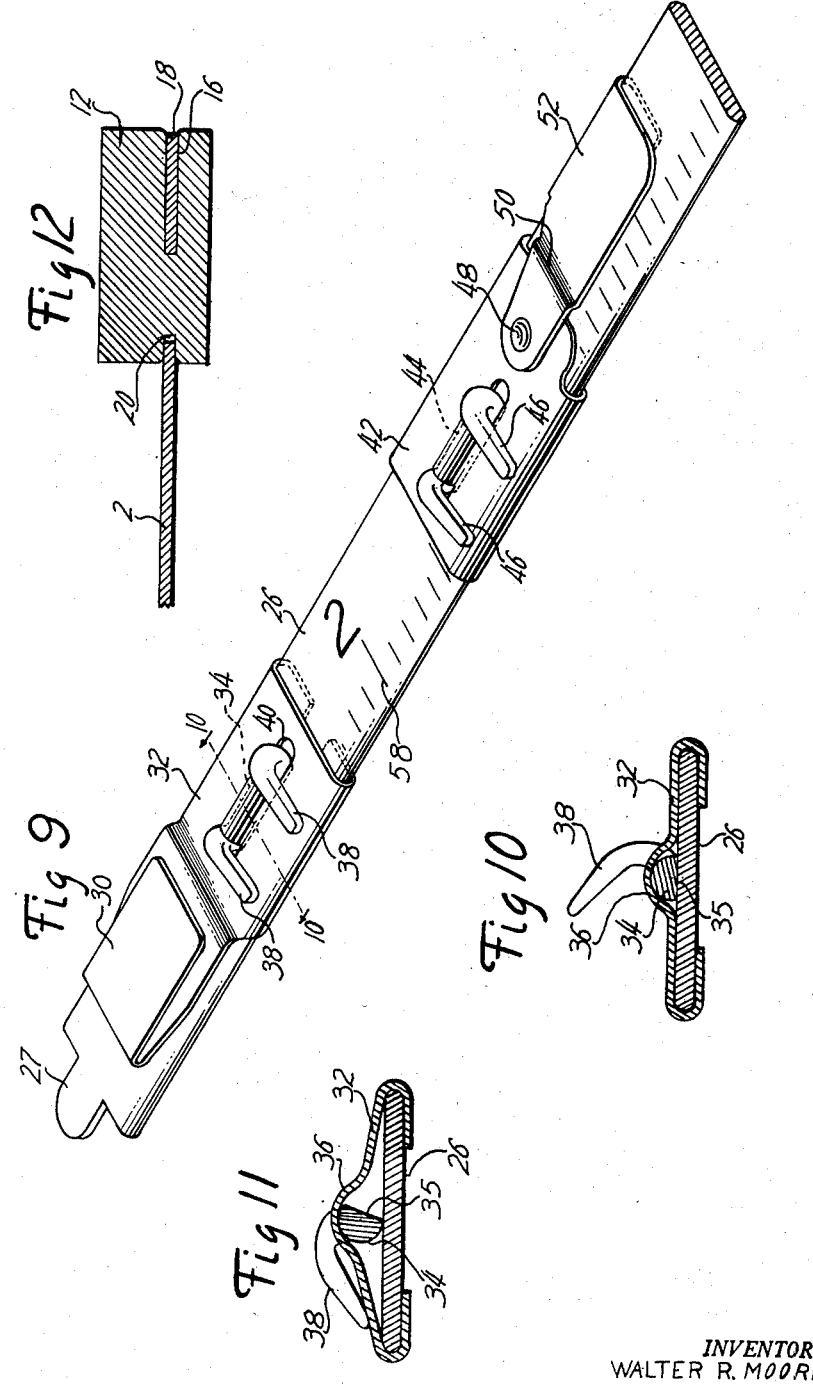

Patented Sept. 18, 1951

2,568,509

UNITED STATES PATENT OFFICE 2,568,509

MANIFOLDING DEVICE

Walter R. Moore, Palmyra, N. J., assignor to Underwood Corporation, New York, N. Y., a corporation of Delaware Application February 26, 1948, Serial No. 11,160

3 Claims. (Cl. 282—3)

1

This invention relates to carbon sheet holders or carriers for supporting one or more sheets of carbon paper while they are being used in a typewriting machine in manifolding work.

The invention is particularly intended for application to carbon carriers of the type illustrated and described in the patent to Crews No. 1,565,550, dated December 15, 1925, and the patent to Kerr No. 2,270,733, dated January 20, 1942, in which the carbon carrier is constructed for use in typing continuous forms which are threaded through and guided by the carrier as they are typed.

In the typing of continuous forms, the forms are usually of standard width and are guided upon both edges by guides formed on or carried by the carbon carrier.

It is often desirable to include, in the set of forms which is being typed, one or more continuous forms which are of less width than the standard forms which make up the remainder of the set. With the carbon carriers which have heretofore been produced, considerable difficulty has been encountered because the relatively narrow forms could not be accurately positioned and guided during the typing operations. One of these narrower forms may be guided along one edge by the regular guiding devices of the carbon carrier, but when the opposite edge is unguided, the form is often displaced laterally in one direction from its normal position. It may be desirable to locate the narrower forms with relation to the carrier so that neither of the edges of a form is guided by the guiding devices heretofore provided on the carrier. When located in such a position, the form may be displaced laterally in either direction and the tendency for the form to be displaced during typing operations is greatly increased.

One object of the present invention is to improve the construction and mode of operation of carbon carriers of the type referred to above and to produce a carbon carrier of this type in which simple and efficient means is provided for guiding the edges of continuous forms which are narrower than the standard forms.

In the operation of manifolding devices of this type, it is frequently desirable to block out certain parts of the typewritten matter on certain of the carbon copies. Also, it is often desirable to be able to attach a protective sheet or a backing sheet to the carrier.

Another object of the invention is to produce a carbon carrier construction in which one or more block-out strips or sheets may be readily attached to the carrier so as respectively to underlie one or more of the carbon sheets and thereby prevent the transfer of certain parts of the typewritten matter upon the underlying work sheets.

Another object of the invention is to produce a carbon carrier construction in which certain supplementary sheets, such as a protective sheet or a backing sheet, may be readily attached to the carrier.

With the above and other objects in view, the invention consists in a carbon carrier embodying the novel and improved constructions, arrangements and combinations of parts hereinafter described and particularly pointed out in the claims, the advantages of which will be readily understood and appreciated by those skilled in the art.

The various features of the invention will be clearly understood from the accompanying drawings illustrating the invention in its preferred forms and the following detailed description of the constructions therein shown.

In the drawings:

Fig. 1 is a plan view as the parts would appear when laid out upon a suitable horizontal support with the carbonized sides of the carbon sheets facing upwardly, this view illustrating the carrier sheet and associated parts and a series of forms applied in operative relation to the carrier sheet, Fig. 2 is a sectional view taken substantially on the line 2—2 of Fig. 1, Fig. 3 is a view similar to Fig. 1 illustrating a different application of certain features of the invention, Fig. 4 is a sectional view taken substantially on the line 4—4 of Fig. 3, Fig. 5 is a view similar to Fig. 1 illustrating a construction embodying another feature of the invention, Fig. 6 is a sectional view taken substantially on the line 6—6 of Fig. 5 and on a larger scale, Fig. 7 is a view similar to Fig. 5 illustrating another application of the construction shown in Fig. 5, Fig. 8 is a sectional view taken substantially on the line 8—8 of Fig. 7 and on a larger scale, Fig. 9 is a detail perspective view illustrating a crossbar constituting one of the features of the invention and certain associated parts, Fig. 10 is a detail sectional view taken substantially on the line 10—10 of Fig. 9, Fig. 11 is a view similar to Fig. 10 illustrating certain of the parts in different positions, Fig. 12 is a detail sectional view taken substantially on the line 12—12 of Fig. 3, Fig. 13 is a detail perspective view illustrating one of the stop blocks for limiting the movement of the carrier and the adjacent portion of the carrier, with a stop block in position to be applied to the carrier, and Fig. 14 is a view similar to Fig. 13 illustrating the stop block located in operative position on the carrier.

The invention, as illustrated in this application, is embodied in a carbon carrier of the type illustrated and described in the patent to Crews No. 1,565,550 and the patent to Kerr No. 2,270,733, referred to above. The carbon carrier comprises a carrier sheet, indicated at 2, arranged to ride on the work web or continuous series of forms to be typed, to which carrier sheet is attached a series of transfer sheets. The carrier sheet is substantially rectangular in outline and consists of a sheet of flexible relatively heavy paper or similar material having sufficient stiffness to maintain its shape laterally and to support the carbon sheets laterally against wrinkling and creasing. The carrier sheet, of course, must be of the proper limited width and have sufficient flexibility to pass about the cylindrical platen of a typewriting machine between the same and the paper table or other work engaging devices opposed to the platen.

Figs. 1 and 3 show only the portion of the carrier between the trailing end and the point at which the carbon sheets are attached, while Figs. 5, 6, 7 and 8 show the complete carrier and the carbon sheets attached to the leading portion of the carrier.

In the present construction, the carrier sheet is provided with transverse slats, indicated at 4, 4a and 4b, produced by forming the carrier sheet with a relatively wide transverse slot 5 and with relatively narrow transverse slots 6. To each of the slats 4, 4a and 4b is attached a carbon sheet, indicated at 8, arranged to extend from the carrier sheet 2 in a direction away from the body of the carrier sheet, as clearly shown in Figs. 5 to 8, inclusive. The carrier sheet is formed with a transverse cutout or slot, indicated at 10, through which the work sheets are threaded.

In order to limit the movement of the carbon carrier between the platen of a typewriting machine and the opposed work web engaging devices, the carrier sheet 2 is provided with the stop blocks, indicated at 12, attached to opposite side margins of the sheet. These stop blocks have the same mode of operation as the stop blocks on the carrier illustrated and described in the copending application of Bernard E. Schaefer, Serial No. 558,502, filed Oct. 13, 1944, patented on February 7, 1950, number 2,496,600. These stop blocks are detachably mounted upon the carrier sheet so that, when the carbon carrier is worn out, its carbon sheets being exhausted, the stop blocks may be detached and applied to another carrier.

The stop blocks are mounted upon the carrier sheet so that they extend some distance from the face of the sheet along which the work webs pass and are spaced from each other by a distance which, in the construction shown, is substantially greater than the width of the work webs which pass between the blocks. The blocks, however, may be spaced from each other substantially the same as or very slightly greater than the width of the work webs so that they constitute guides for the side edges of the work webs which engage the same in passing along the carrier. Each of the stop blocks is detachably mounted in a suitable slot in a side marginal portion of the carrier 2.

The stop blocks are in the form of rectangular prisms and are mounted on the carrier with their greatest dimensions respectively substantially parallel with the side edges of the carrier. Each stop block is mounted in a slot 14 in the carrier sheet. The block is formed with a cleft 16 to receive the marginal portion 18 of the carrier sheet between the slot and the adjacent end portion of the sheet. In order to hold the stop block in the slot, the carrier is formed with a projection 20 arranged to engage in a recess or groove 22 formed in the inner end of the block.

In applying the stop block to the carrier sheet, the block is manipulated to engage the portion 18 of the sheet in the cleft 16, and the inner end of the block is then moved transversely of the carrier sheet until the block is located substantially in the position shown in Figs. 12 and 14. During this operation, the projection 20 is bent aside and, when the block is finally located, the projection engages in the recess 22 to hold the block in position.

The stop block may be readily removed from the carrier sheet by moving the inner end of the block in a direction transverse to the plane of the sheet thereby removing said end from the slot 14, after which the block may be moved longitudinally to disengage the portion 18 of the sheet from the cleft 16. In the first part of this operation, the projection 20 is bent aside to allow the inner end of the block to be removed from the slot.

With this construction, the stop blocks 12 limit the movement of the carbon carrier between the platen and the paper table of the typewriting machine and may be arranged to constitute guides for the side margins of the work webs. As shown in Figs. 1, 3, 5 and 7, the work webs or forms all pass from above the trailing end of the carrier, upon which the stop blocks are mounted, between said blocks and then down through the slot 10. The work web 24 then passes upwardly through the slot 5 and extends over the carbon sheet 8 attached to the slat 4. The next work web 24a extends upwardly through the slot 6 and under the carbon sheet 8 attached to the slat 4a. The third work web 24b extends upwardly through the slot 6a and under the carbon sheet 8 attached to the slat 4b. The fourth work web 24c passes under the other work webs and under the carbon sheet 8 attached to the slat 4b. Figs. 6 and 8 also show the manner in which the work webs are threaded through the carrier and between the carbon sheets.

In the operation of the device above described, the continuous forms or work webs are threaded through the carbon carrier in interleaved relation to the carbon sheets and the assembly of carbon carrier, carbon sheets and work webs is introduced between the cylindrical platen and the paper table and feed rolls of a typewriting machine. The said assembly is then positioned in the usual manner for writing upon the first form. At the conclusion of the typing operation, the assembly is advanced until the stop blocks 12 engage the platen, thereby locking the carbon carrier from further advance movement. The feed rolls are then positioned to release the assembly, the forward ends of the work webs are grasped by the operator and the webs are drawn forward with relation to the carbon carrier until a new or blank set of forms is introduced into typing position with relation to the carrier and the carbon sheets. The typed set of forms may then be severed from the assembly along the weakened lines with which the forms are usually provided, after which the feed rolls are restored to pressure position with relation to the platen and the assembly is backfed to place the next set of forms in typing position.

The work webs 24 and 24c are one of the standard widths. The work web 24c is guided by the engagement of its opposite edges with the ends of the slot 10 and the corresponding ends of the slot 5. The work web 24 is guided by the engagement of its opposite edges with the ends of the slot 10.

In the setup shown in Figs. 1 and 2, the work webs 24a and 24b are narrower than the standard widths, and an especial provision is made for guiding one edge of each of these webs. To this end a transverse supporting bar 26 is mounted at its ends upon the stop blocks 12 and is arranged to support guides for one margin of each of these work webs. The bar 26 preferably consists of a strip of material which is relatively flexible in directions transverse to the normal plane thereof and highly resilient, such as spring steel. This bar is provided, at its ends, with relatively narrow projections 27 having rounded ends which loosely engage respectively in recesses 28 formed in the blocks 12 to support the bar in a position substantially parallel with the carrier 2 in spaced relation to the carrier. As shown in Fig. 2, in this setup, the work webs 24 and 24a pass over the bar 26 while the work webs 24b and 24c pass under said bar. As shown in Fig. 1, the left-hand edge of the work web 24a is in registration with the corresponding edges of the forms 24 and 24c and is guided by its engagement with the corresponding ends of the slots 10 and 6. In order to position and guide the right-hand margin of the work web 24a, a guide hook 30 is mounted on the bar 26 on the upper side thereof for adjustment longitudinally of the bar and widthwise of the carrier. The guide hook 30 preferably consists of a section of sheet metal folded upon itself to form a loop to receive the edge of the work web. This guide is supported upon a carrier 32 also preferably formed of sheet metal and shaped to embrace the bar 26, as shown in Figs. 10 and 11. The carrier 32 and the guide 30 are preferably formed integrally from a single piece of sheet metal. The carrier 32 is fixed to the bar 26 by means of an eccentric rocker 34 mounted to turn in a loop 36 in the carrier forming a bearing for the rocker to which rocker are fixed operating arms 38 passing outwardly through openings 40 in the carrier. The rocker 34 is provided with a flat face 35 which is positioned in engagement with the opposed flat face of the bar 26 by a manipulation of one of the arms 38 to free the carrier for movement longitudinally of the bar. To fix the carrier to the bar, the rocker 34 is turned to a position such as that shown in Fig. 11 in which a portion of the rocker farther from the axis of the same than the flat face thereof is engaged with the bar. This raises the loop portion 36 of the carrier, as shown in Fig. 11, and the spring action of the metal of which the carrier preferably is formed maintains the carrier in position on the bar.

As shown in Figs. 1 and 2, the work strip or web 24b also is less than standard width and is positioned so that its right-hand edge is in substantial registration with the corresponding edges of the work webs 24 and 24c. The right-hand edge of the work web 24b is guided by its engagement with the corresponding ends of the slot 10 and the slot 6a. In order to guide the left-hand edge of the work web 24b, a guide hook 30 is mounted on the lower side of the bar 26 with the hook thereof in the reverse position, as compared with the corresponding guide hook for the work web 24a. The guide hook for the work web 24b is mounted on a carrier 32 adjustable longitudinally of the bar 26, and the carrier is secured in adjusted position on the bar by means of an eccentric rocker 34 mounted in a bearing on the carrier and having operating arms 38.

The bar 26 is constructed to accommodate several guides for the edges of work webs, and where one edge of a work web is aligned with the standard work webs 24 and 24c, the other edge of each web will be efficiently guided by the corresponding guide 30.

Figs. 3 and 4 show an arrangement of guides for guiding a work web which is narrower than the standard webs and in which neither of the edges of the narrower web is aligned with an edge of a standard web. In this case, also, the work webs 24 and 24a pass above the bar 26 and the webs 24b and 24c pass below said bar. As shown in these figures, the work webs 24, 24b and 24c are all of standard widths, while the width of the work web 24a is considerably less than the standard width. Also, the edges of the work web 24a are both out of alignment of the corresponding edges respectively of the work webs 24, 24b and 24c. In order to position and guide the opposite edges of the work web 24a, guides 30 are mounted upon the upper side of the supporting bar 26. Each of these guides is supported upon a carrier 32 mounted for adjustment longitudinally on the bar 26 and provided with an eccentric clamping device such as that above described for securing the carrier in adjusted position on the bar. The hooks of the guides 30 face in opposite directions so as to receive the opposite margins of the work web 24a, as shown in Fig. 4.

By means of the guiding devices, carried by the bar 26, the continuous work strips or forms having widths less than the standard width are accurately positioned laterally with relation to the other strips and are guided efficiently during the pulling of the strips through the carrier.

While the original form is being typed and copies of the typewritten matter are being made on the forms beneath the carbon sheets, it is often desirable to prevent the copying of a part of the typewritten matter on one or more of the forms. To enable this result to be obtained, provision is made for supporting one or more "blocking-out" strips or sheets upon the bar 26 so that they will extend between one or more of the carbon sheets and the underlying work sheets or strips, as shown in Figs. 5 and 6. In this case, as in the setups shown in Figs. 1 and 2 and in Figs. 3 and 4, the work webs 24 and 24a pass above the bar 26, and the webs 24b and 24c pass below said bar.

In the present construction, the devices for supporting a blocking-out strip comprise a carrier 42 having substantially the same construction as the carrier 32 and mounted in substantially the same manner upon the bar 26 for adjustment longitudinally of the bar. The carrier is arranged to be clamped upon the bar by means of an eccentric rocker 44 mounted in the carrier and having operating arms 46, these devices having substantially the same construction and mode of operation as the corresponding devices for each of the carriers 32. Pivoted at 48, upon the carrier 42, is a paper clamp 50 having the construction shown in Figs. 5, 6 and 9. As shown in these figures, the paper clamp is formed from relatively stiff sheet material, such as sheet metal, and the paper clamping portion, indicated at 52, Figs. 6 and 9, is bent in a U-shape and arranged to embrace one marginal portion of the bar 26.

In the operating of the paper holding devices, above described, before the paper block-out strip is applied to the bar 26, the paper clamp is swung away from the bar. One end portion of the block-out strip is then folded about the edge portion of the bar more remote from the carbon sheets, and the clamping device is then swung back into position to embrace the bar and the folded-over portion of the block-out strip.

Figs. 5 and 6 show a block-out strip, indicated at 54, attached at one end to the bar 26 by means of two clamping devices 50 arranged at opposite sides of the strip. This strip 54, which is relatively narrow as compared with the continuous forms, extends from the bar 26 between the forms 24a and 24b and between the form 24a and the carbon sheet 8 attached to the slat 4a of the carrier. This strip will prevent the copying upon a form 24a of all the typewritten matter which falls between the two side margins of the strip, provided that the strip extends for the full length of the carbon sheet 8 attached to the slat 4a. The strip 54 may be terminated short of the leading edge of the carbon sheet 8 attached to the slat 4a. In that event, of course, the typewritten matter will be blocked out only for a part of the length of said carbon corresponding to the length of the block-out strip.

It is often desirable to locate a protective strip or sheet between the outer or original work sheet 24c and the carbon sheet attached to the slat 4b to form a pad to protect the first carbon sheet 8 from the repeated blows of the type. Figs. 7 and 8 show an application of the paper holding devices shown in Figs. 5 and 6 in which these devices are employed to attach such a protective sheet to the bar 26. As shown in these figures, the protective sheet, indicated at 56, is secured at one end to the bar 26 by means of two clamping devices 50, each pivoted upon a carrier 42 slidably supported upon the bar 26 and held in place by a suitable holding device. The end portion of the protective sheet 56 engaged by the clamping devices is considerably narrower than the body of said sheet, as shown in Fig. 7. This protective sheet extends beneath the original work strip 24c and forms a cushion when the parts are wrapped around the platen to protect the first carbon sheet 8 against the repeated blows of the type which often cut or injure quickly this carbon.

The engagement of the rounded projections 27 on the ends of the bar 26 loosely in similarly shaped recesses in the stop blocks 12, which preferably are somewhat wider than the thickness of the bar, enables the stop blocks to be installed without regard to perfect angular positioning. These connections between the bar and the stop blocks allow a great deal of freedom of motion to the bar. This manner of mounting the bar together with the flexibility of the bar avoids the catching of the edges of the perforations in the work webs on the bar.

The bar 26 may be provided with a scale, such as that indicated at 58 in Fig. 9, to assist the operator in locating the guides or clamping devices in predetermined positions on the bar.

The bar 26 may be readily applied to the carrier sheet by inserting the rounded projection 27 at one end of the bar in one of the recesses 28 in a stop block, and then bending the bar until the projection 27 in the other end thereof may be inserted in the recess 28 in the other stop block. Then, upon the release of the bar, the resilience of the material will straighten out the bar and hold the same in position.

A backing sheet (not shown) may be arranged to extend beneath all the work webs 24, 24a, 24b and 24c and may be attached to the bar 26 by clamping devices 50 mounted on carriers 42 in substantially the same manner as the protective sheet 56. In this case, all the work webs will pass inside of the bar 26 between the same and the carrier sheet.

Various combinations of paper guides, of paper holding clamps and of clamps and guides may be arranged with the present construction. If desired, two or more of the bars 26 may be mounted on each set of stop blocks, thereby providing for supporting a relatively large number of web guides and paper clamps. In this case, each stop block will be provided with two or more recesses 28 for the insertion of the projections 27 at the ends of the bars 26.

The provision for adjustment of the guides longitudinally of the bar 26 enables the guides to be adjusted to guide any width of work web within certain limits and to locate, within certain limits, a relatively narrow web in any desired transverse position with relation to the carrier and the other webs.

The provision for adjustment of the paper clamps longitudinally of the bar 26 enables these clamps to be located to hold a large variety of widths of paper strips or sheets in position on the bar and to locate the sheets or strips in various positions transversely of the carrier.

The paper clamps and paper guides may be applied to the same supporting bar 26 or to different bars to produce a large number of different combinations.

If desired, a supplemental sheet of transfer paper may be attached to the bar 26 by the paper clamps and the work webs may be arranged in any desired relation to this supplemental transfer sheet.

The paper clamps may be employed to support a single blocking-out sheet or strip, or a combination of paper clamps may be arranged to support two or more blocking-out strips or sheets.

It is to be understood that, except as defined in the claims, the invention is not limited to the particular construction and arrangement of parts of the illustrated embodiments of the invention, but that the invention may be embodied in other forms within the scope of the claims.

Having explained the nature and object of the invention, and having specifically described constructions embodying the several features of the invention in their preferred forms, what is claimed is:

1. A manifolding device comprising a carrier formed of flexible sheet material, one or more carbon sheets attached to said carrier, a stop block on said carrier adjacent each lateral edge thereof, a bar extending across said carrier and detachably connected at its ends to said stop blocks, a pair of members slidably mounted on said bar, each of said members having a portion formed to provide a guide for an edge of a work sheet, and means for locking said members to said bar at any desired positions therealong.

2. A manifolding device comprising a carrier formed of flexible sheet material, one or more carbon sheets attached to said carrier, a stop block mounted on said carrier adjacent each lateral edge thereof, a bar extending across said carrier and detachably connected at its ends to said stop blocks, a guide member having a portion slidably embracing said bar and a portion formed to provide a retaining recess to slidably embrace an edge of a continuous work form, and means for locking said guide member to said bar at any desired position therealong.

3. A manifolding device comprising a carrier formed of flexible sheet material, one or more carbon sheets attached to said carrier, a stop block mounted on said carrier adjacent each lateral edge thereof, a flat bar extending across said carrier and connected at its ends to said stop blocks in such manner that the wider dimension of said bar lies in a plane parallel to the plane of the carrier and spaced therefrom sufficiently to permit several parts of a set of continuous forms to pass between the bar and the carrier, a pair of members slidably mounted on said bar, each of said members having means for locking same to said bar at any desired position therealong, and each of said members having a portion formed to provide a retaining recess for an edge of a continuous work form.

WALTER R. MOORE.

REFERENCES CITED

The following references are of record in the file of this patent:

UNITED STATES PATENTS

| Number | Name | Date |
|---|---|---|
| 1,052,012 | Purdy | Feb. 4, 1913 |
| 1,594,785 | Lindburg | Aug. 3, 1926 |
| 2,270,733 | Kerr | Jan. 20, 1942 |
| 2,320,918 | Fader | June 1, 1943 |
| 2,496,600 | Schaefer | Feb. 7, 1950 |

FOREIGN PATENTS

| Number | Country | Date |
|---|---|---|
| 543,828 | Great Britain | Mar. 13, 1942 |